Aug. 31, 1948.        J. J. ANTALEK        2,448,407
CONDENSER
Filed Feb. 21, 1945
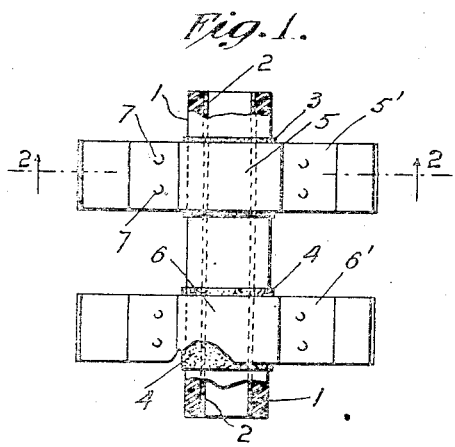
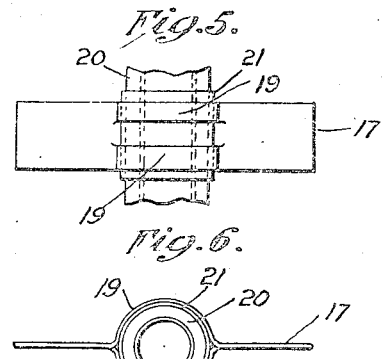
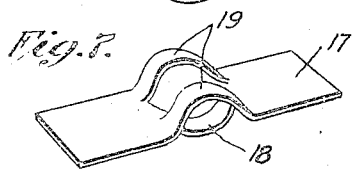
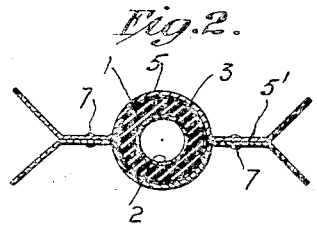
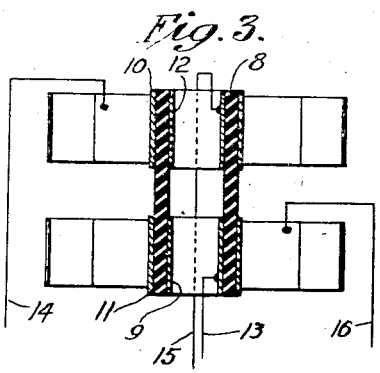
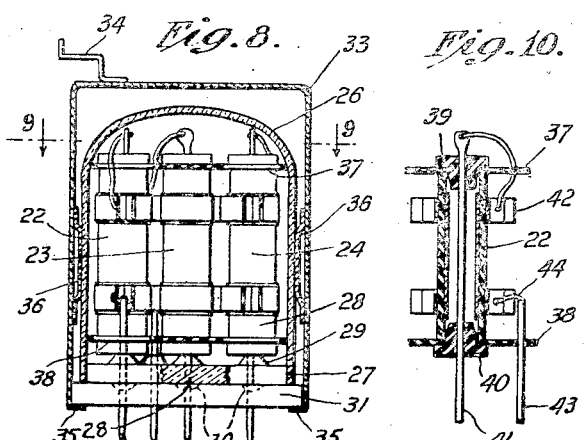
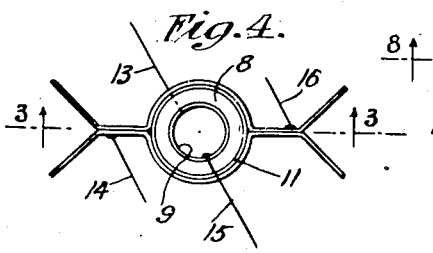
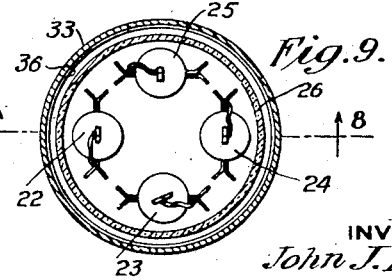
INVENTOR
John J. Antalek
BY
*Paul Kolisch*
ATTORNEY Patented Aug. 31, 1948

2,448,407

UNITED STATES PATENT OFFICE 2,448,407

CONDENSER

John J. Antalek, Chicago, Ill., assignor to The Rauland Corporation, Chicago, Ill., a corporation of Illinois Application February 21, 1945, Serial No. 578,999

9 Claims. (Cl. 175—41)

This invention relates to new and useful improvements in condensers.

An object of the invention is a condenser unit of small size which has a high breakdown resistance, even when subjected to radio frequency currents of relatively high intensity.

Another object of the invention is an assembly of several condenser units forming a small and compact structure which may be subjected to extreme working conditions.

In order to achieve these and other objects of the invention, the condenser dielectric is of a relatively high dielectric constant and is preferably made of a tubular shape formed of a titanium compound in a ceramic binder. The condenser electrodes consist of a metal film or films arranged on the inside and outside of the dielectric tube.

A condenser unit, if necessary together with other units, is mounted in a closed atmosphere of relatively high thermal conductivity of a gas or a vapor which is relatively inert to the dielectric, even at high operational temperatures.

A specific embodiment of the invention is a number of such condenser units arranged substantially parallel to each other in a sealed glass vessel containing hydrogen at atmospheric pressure.

Still another object of this invention is to increase heat transfer from the condenser unit to the surrounding gas or vapor atmosphere by providing heat-radiating fins thereon.

In order to insure simple and accurate assembly of several condenser units, according to another aspect of this invention the condenser units are mounted substantially parallel to each other between two insulating discs so as to form a single structure which can be supported on the bottom part of a glass or metal envelope in a more or less customary manner. The same bottom part contains the lead-in seals connecting the condenser electrodes to the outside.

The invention is illustrated in the accompanying drawings in which:

Fig. 1 is a front view of a condenser unit;

Fig. 2 is a sectional view on line 2—2 of Fig. 1;

Figs. 3 and 4 represent a modification of the embodiment according to Figs. 1 and 2, Fig. 3 being a section along line 3—3 of Fig. 4;

Figs. 5, 6 and 7 represent front, end and partial perspective views of a further modification of Figs. 1 and 2;

Figs. 8 and 9 are vertical and transverse sections along lines 9—9 and 8—8, respectively, said sections being of portions of an assembly containing several condenser units; and Fig. 10 is a sectional view through one of the condenser units of Figs. 8 and 9.

In Figs. 1 and 2, each unit of a condenser assembly (assuming that the condenser consists of more than one unit as is the case with the preferred embodiment disclosed below) consists of a tube 1 made of a titanium compound in a ceramic binder or some other composition having a dielectric constant of the order of 85. The inside surface of tube 1 has a very thin silver coating 2 and the outside surface has coated thereon two spaced collars 3 and 4, which are also thin layers of silver. Silver coating 2 represents two electrodes connected in series opposing the two outer electrodes. The condenser unit thus formed consists, in fact, of two identical series connected condensers. The outer collars 3 and 4, with the associated radiating fins, serve to connect the two condensers with a utilization circuit. Each silver collar 3 and 4 has fastened thereto contact sheets 5 and 6, respectively, made of nickel and provided with radiating fins 5' and 6'.

As can be seen from Fig. 2, contact plates 5 surround the sleeve 3 and are held firmly against it by means such as welded points 7. The ends of the radiating fins 5', 6' are bent out to insure good heat transfer to the surrounding atmosphere.

It is noted that the metallic cooling structure comprising contact sheets and radiating fins is both electrically and thermally conductive and is in both respects coupled with and supported by the outer electrode. The structure serves the dual purpose of affording a convenient terminal for lead wires, whereby a capacitor unit may be employed in an external circuit and will be properly cooled.

Instead of one continuous inner coating, two spaced inner coatings, or inner collars, can be provided, forming separate electrodes opposing the corresponding outer electrodes as shown in Figs. 3 and 4.

In Figs. 3 and 4, the tubular dielectric 8 carries two pairs of longitudinally separated inner and outer electrodes 9, 11 and 10, 12, respectively, forming two separate condensers connected to the leads 13, 16 and 15, 14, respectively.

The two condensers may be used either in parallel or in series by connecting together leads 14 and 16 and 13 and 15 or by connecting together only leads 13 and 15. The leads for the parallel pair will comprise lead 14 along with lead 16 and lead 13 along with lead 15 whereas the connections to the series pair will be through leads 14 and 16.

It is possible, of course, to provide only one outside coating instead of two, and only one inner collar, thus forming a single condenser on the tubular dielectric without departing from the scope of this invention. Furthermore, the inner or outer collar, or collars, may be made adjustable inside or outside the tubular dielectric to vary the capacity of the condenser or condensers, if required.

Figs. 5 and 6 show a modification of radiating fins which are simple to make and easy to attach. They can be made to engage the electrodes on the outside of the tubular dielectric with spring force. A perspective of this as shown in Fig. 7 consists of a metallic strap 17 which may be made of nickel, the center portion 18 of which is cut in, by stampings, and bent out of its plane, thus forming with the remaining side portions 19 which are similarly bent out to the plane of strip 17, a cylindrical space in which the dielectric tube 20 is tightly held, as shown in Figs. 5 and 6, at a point where the outer electrode film 21 is arranged. Assembly becomes very simple; no welding is required. If necessary, the longitudinal location of the fin may be assured by soldering strap 17 against the underlying metal film forming electrode 21.

Figs. 8 and 9 illustrate an assembly consisting of four condenser units 22, 23, 24 and 25, each constructed in the manner shown in Figs. 1 and 2 and employing leads as shown in Fig. 10. These four condensers are mounted within a glass envelope 26 having a glass bottom 27 through which the eight lead-in wires 28 of the four condenser units extend and into which these wires are sealed, as indicated at 29. For an assembly consisting of four such condensers there will be four pairs of lead-in wires 28, each lead-in wire being sealed through bottom 27.

The glass envelope 26 may be evacuated in the customary manner through a hole in glass bottom 27 and, according to the present invention, is filled with hydrogen at a pressure of approximately one atmosphere. There is no objection to much higher pressures or to somewhat lower pressures, but I have found hydrogen at a pressure of approximately one atmosphere a very good heat conductor and one which prevents the occurrence of corona discharge. Exhausting and filling operations, as well as tube construction, were found to be easiest when pressure of the order of one atmosphere is used.

Heat conductivity can be further increased by making envelope 26 of metal.

Attempts to obtain comparable results by filling envelope 26 with other gases have not been successful. Carbon dioxide and nitrogen are not as good heat conductors as hydrogen, and corona discharge was observed when the envelope was filled with helium.

A condenser of the above nature apparently never breaks down or punctures when radio frequency currents of relatively high intensity are applied thereto. When the condenser heats up on account of the application of excessive radio frequency current, the electric properties change but not irreversibly. Once the condenser cools off, it will again operate normally.

The lower ends of lead-in wires 28 which project from glass bottom 27 are soldered or otherwise fastened at 30 to terminals of a porcelain or steatite disc 31. Connections may be soldered to terminals or they may be formed as plugs 32 adapted to engage jack contacts. The whole assembly is placed within a container 33 of aluminum or the like, the upper end of which is closed and provided with attachment lugs 34 and the lower end of which is open and arranged to be turned over at one or more points to hold the porcelain disc 32 in place. Two of these turned-over points are indicated at 35. Firmly to anchor the glass envelope 26 within the container 33 a corrugated resilient spacer 36 is provided in the space between container 33 and envelope 26, or formed on the inside of container 33.

The mounting structure for the condenser units 22, 23, 24 and 25 can be seen from Fig. 10. One of the dielectric tubes, say 22, is shown positioned between two perforated mica or other suitable insulating plates 37 and 38 held thereto by means of stoppers 39 and 40, respectively, also of insulating material, and which project within the two ends of the tube 22. A wire 41 extends through the tube 22 and the two stoppers 39 and 40. The lower end of the wire 41 can be used for connection with a circuit and its upper end is connected to contact plates 42. Another lead-in wire 43 projects through the lower mica disc 38 and is connected with contact plates 44. Wires 41 and 43 of Fig. 10 exactly correspond to what have been called lead-in wires 28 in the description of the whole assembly shown in Fig. 8.

The entire unitary inner assembly of the four condenser units 22, 23, 24 and 25 is supported through lower stoppers 40 on seals 29 by the wires which pass through these stoppers and are embedded in seals 29.

Instead of this arrangement, the entire inner unitary assembly may be supported by joining the lower mica disc 38 to bottom 27. The connecting means between disc 38 and bottom 27 may be of any conventional sort such as by wires bent through disc 38 and sealed into bottom 27. This alternate arrangement is not shown in any figure of the drawing.

The condenser units can be supported within envelope 26 in any other desired way without exceeding the scope of this invention.

Experimental assemblies have been built according to this invention which contain four condenser units corresponding to units 22, 23, 24 and 25 as shown in Figs. 8 and 9. Each of these units add a capacity of the order of 500 micro-micro-farads and the ceramic element used in each section unit measured $1\frac{1}{16}$" in length and $\frac{1}{4}$" in diameter. Such a unit had capacity and current carrying properties comparable to ordinary mica condensers measuring $1\frac{13}{16}$" by $2\frac{13}{16}$" in size or to customary cylindrical type of mica condensers $2\frac{1}{2}$" long and $3\frac{1}{2}$" in diameter.

The size of the entire assembly containing these four units was $1\frac{3}{8}$" in diameter and $2\frac{1}{2}$" in length. These dimensions allowed for an external metallic shield and the sealed glass element contained therein and corresponding to element 26 in Figs. 8 and 9 are only $2\frac{1}{4}$" long and $1\frac{1}{2}$" in diameter. Obviously the compactness of assembly built according to this invention can be realized, and corresponding savings of space enjoyed as assemblies, and units of either increased or decreased capacitance constructed.

What I claim is:

1. An assembly according to claim 2, wherein said container includes a metal portion.

2. In a condenser assembly, a number of tubular dielectric elements formed of a titanium compound in a ceramic binder, each of said dielectric elements having on at least a portion of its external surface a conductive electrode film having at least two longitudinally separated portions, each of said dielectric elements having on its inner surface a conductive electrode film opposing all of said portions and situated substantially coaxial thereto, said dielectric elements being grouped together so that their axes are substantially parallel and all lie along the surface of the same imaginary cylinder, said dielectric elements being located between the same bases of said imaginary cylinder, a closed substantially cylindrical glass container having a bottom, metallic conductors mechanically and electrically connected to said longitudinally separated portions, said conductors having portions thereof extending substantially parallel to the axes of said dielectric elements, extending in the same direction, and passing through and sealed to said bottom, and a good heat-conducting gas in said container relatively inert to said dielectric elements.

3. In a condenser assembly, a number of tubular dielectric elements formed of a titanium compound in a ceramic binder, each of said dielectric elements having on at least a portion of its external surface a conductive outer electrode film having two longitudinally separated portions, each of said dielectric elements having on its inner surface a conductive electrode film opposing both of said portions and situated substantially coaxial thereto, a plurality of metallic electrically conductive and heat-conducting means each in electrical and thermal contact with one of said separated portions and physically connected thereto, a closed substantially cylindrical glass container having a bottom, a plurality of metallic conductors each being physically and electrically connected to one of said conducting means and having portions which extend substantially parallel to the axes of said dielectric elements and extend in the same direction, one of said portions of said conductors passing within and through each of said dielectric elements, all of said portions of said conductors passing through and being sealed to said bottom, and a filling of hydrogen in said container.

4. An assembly according to claim 2, including substantially circular insulating discs, said dielectric elements being supported between said insulating discs, said discs occupying positions substantially corresponding to said imaginary bases of said imaginary cylinder, means for joining said dielectric elements to said discs to form a unitary structure, and means for supporting said structure through one of the discs on said bottom.

5. An assembly according to claim 2, substantially cylindrical insulating discs, said dielectric elements being held between said insulating discs and being substantially perpendicular thereto, means for attaching the dielectric elements to said discs to form a unitary structure, said attaching means including plugs inserted through holes in said discs and into the dielectric elements, said plugs having center holes for passing said portions of said conductors through said dielectric elements.

6. A condenser assembly comprising a tube formed of a substance containing titanium and bound together in a ceramic binder and having a dielectric constant of the order of 85, an electrode film composed of a coating of silver on the inside surface of the tube, two electrode films comprising silver sleeves coated on the outside surface of the tube, said two electrode films last-mentioned covering different portions of the outer surface of said tube and each opposing a portion of said first-mentioned electrode film, at least two electrically conductive and heat-conducting and heat-dissipating means composed of nickel having radiating fins, at least one of said conducting means being in electrical and thermal contact with and being mechanically connected to each of said last-mentioned electrode films, a sealed glass envelope containing hydrogen at substantially atmospheric pressure enclosing said tube, two lead-in wires projecting through and sealed to said envelope, the first of said wires being connected to one of said conducting means connected to one of said electrode films last-mentioned, the second of said wires being connected to one of said conducting means connected to the other of said electrode films last-mentioned, said second wire passing within and through said tube, a base of insulating material, said base being attached to the bottom end of said substantially cylindrical envelope, said base having contact points to which said wires are fastened on the outside of said bottom of said cylindrical envelope, a metal casing surrounding said envelope, and means for resiliently supporting said metal casing in its position surrounding said envelope.

7. A multiple condenser assembly including a substantially cylindrical sealed glass envelope, in which a plurality of tubular elements with their associated electrode films and conducting means according to claim 6 are assembled so that their axes are substantially parallel and lie on the surface of an imaginary cylinder somewhat smaller in diameter than said substantially cylindrical envelope, and so that said tubes are positioned between the imaginary bases of said imaginary cylinder, said conducting means passing through and being sealed to said envelope, also including an upper and a lower substantially circular insulating disc for holding the upper and lower ends of the tubes in said positions and in spaced relationship to one another and to the walls of the envelope, a plug of insulating material for each end of each tube and adapted to attach it to one of said insulating discs, said plugs having center holes permitting one of each of half of said conductors to pass in and through each of said tubes, one of each of said half of said conductors passing through the center holes of each pair of said plugs associated with each of said tubes and through each of said tubes, and a filling of hydrogen gas in said envelope.

8. A condenser assembly, a number of substantially parallel spaced dielectric tubes each formed of a titanium compound in a ceramic binder and each having opposing electrodes, a closed substantially cylindrical container including a bottom, said container enclosing a good heat-conducting gas relatively inert to said dielectric tubes, said gas being at substantially atmospheric pressure, conductors extending substantially parallel to said dielectric tubes for connecting the electrodes to external circuits through said bottom, means including a pair of substantially circular spacer insulating discs holding the dielectric tubes therebetween to form a unitary structure, and means for supporting said unitary structure inside said container.

9. A condenser assembly comprising a tubular dielectric element formed of a titanium compound in a ceramic binder, on the tubular element at least one outer conductive electrode film and an inner conductive electrode film opposing all outer electrode films and situated substantially coaxial thereto, a metallic electrically-conductive and heat-conducting means in electrical and thermal contact with each outer electrode film and physically connected thereto and comprising heat dissipating surfaces extending outwardly from the tubular element into space surrounding it, a substantially cylindrical sealed container enclosing said tubular element along with said electrode films and said electrically-conductive and heat-conducting means, a metallic conductor for each outer electrode film electrically connected thereto over said electrically-conductive and heat-conducting means within the container and extending from it to the exterior of the container through an insulating seal, and a filling of hydrogen in said container.

JOHN J. ANTALEK.

REFERENCES CITED

The following references are of record in the file of this patent:

UNITED STATES PATENTS

| Number | Name | Date |
|---|---|---|
| Re. 16,126 | Schuler | July 28, 1925 |
| 1,494,939 | Abbott | May 20, 1924 |
| 1,518,688 | Cage | Dec. 9, 1924 |
| 1,918,825 | Pickard | July 18, 1933 |
| 2,075,891 | Dubilier | Apr. 6, 1937 |
| 2,107,031 | Evans | Feb. 1, 1938 |
| 2,129,008 | Kater | Sept. 6, 1938 |

FOREIGN PATENTS

| Number | Country | Date |
|---|---|---|
| 524,435 | Great Britain | Aug. 6, 1940 |
| 584,310 | Germany | Sept. 18, 1933 |